US 12,510,743 B2

(12) United States Patent
Dias et al.

(10) Patent No.: US 12,510,743 B2
(45) Date of Patent: Dec. 30, 2025

(54) COMPUTER SYSTEM FOR DISPLAYING SAMPLE IMAGES, MICROSCOPE SYSTEM, AND METHOD THEREFOR

(71) Applicant: LEICA MICROSYSTEMS CMS GMBH, Wetzlar (DE)

(72) Inventors: Gabriel-Roberto Dias, Wetzlar (DE); Patric Pelzer, Wetzlar (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 82 days.

(21) Appl. No.: 18/438,587

(22) Filed: Feb. 12, 2024

(65) Prior Publication Data
US 2024/0272415 A1    Aug. 15, 2024

(30) Foreign Application Priority Data

Feb. 15, 2023 (DE) .......................... 102023103635.1

(51) Int. Cl.
| | |
|---|---|
| *G02B 21/36* | (2006.01) |
| *G06F 3/04842* | (2022.01) |
| *G06F 3/04845* | (2022.01) |

(52) U.S. Cl.
CPC ....... *G02B 21/365* (2013.01); *G06F 3/04842* (2013.01); *G06F 3/04845* (2013.01); *G06F 2203/04806* (2013.01)

(58) Field of Classification Search
CPC .. G02B 21/365; G02B 21/368; G02B 21/367; G06F 3/04842; G06F 3/04845; G06F 2203/04806; G06F 3/0482; G06F 3/04812; G06F 3/0488
See application file for complete search history.

(56) References Cited

U.S. PATENT DOCUMENTS

| | | | |
|---|---|---|---|
| 6,272,235 B1 | 8/2001 | Bacus et al. | |
| 7,292,251 B1* | 11/2007 | Gu | G06T 9/00 |
| | | | 382/128 |
| 7,602,996 B2 | 10/2009 | Maddison | |
| 10,139,613 B2 | 11/2018 | Hing et al. | |
| 12,332,420 B2* | 6/2025 | Amthor | G02B 21/361 |
| 2013/0215251 A1* | 8/2013 | Yamamoto | G02B 21/36 |
| | | | 348/79 |

(Continued)

FOREIGN PATENT DOCUMENTS

| | | |
|---|---|---|
| DE | 69834564 T2 | 4/2007 |
| DE | 602004008681 T2 | 6/2008 |

(Continued)

*Primary Examiner* — John R Schnurr
(74) *Attorney, Agent, or Firm* — LEYDIG, VOIT & MAYER, LTD.

(57) ABSTRACT

A computer system for displaying sample images includes one or more processors configured to receive at least one sample image, each of the at least one sample images having been obtained by imaging a sample located in or on a sample holder using a microscope according to an imaging process; receive or generate spatial context information regarding the at least one sample image, the spatial context information having reference to the imaging process for obtaining the at least one sample image; and control a display to display the at least one sample image on the display based on the spatial context information regarding the at least one sample images.

17 Claims, 4 Drawing Sheets

(56) References Cited

U.S. PATENT DOCUMENTS

| | | | |
|---|---|---|---|
| 2013/0265322 A1* | 10/2013 | Tsujimoto | G06T 11/001 |
| | | | 345/589 |
| 2014/0184778 A1* | 7/2014 | Takayama | G06T 3/40 |
| | | | 348/79 |
| 2015/0117730 A1* | 4/2015 | Takayama | G02B 21/367 |
| | | | 382/128 |
| 2017/0076481 A1* | 3/2017 | Koga | G06T 11/60 |
| 2017/0116715 A1* | 4/2017 | Takayama | G02B 21/367 |
| 2021/0183034 A1* | 6/2021 | Chang | G01N 21/6456 |
| 2022/0011561 A1* | 1/2022 | Schumann | G02B 21/361 |
| 2024/0303952 A1* | 9/2024 | Ashman | G06V 10/993 |

FOREIGN PATENT DOCUMENTS

| | | |
|---|---|---|
| DE | 102012021726 A1 | 5/2014 |
| DE | 202011110651 U1 | 7/2015 |

\* cited by examiner

COMPUTER SYSTEM FOR DISPLAYING SAMPLE IMAGES, MICROSCOPE SYSTEM, AND METHOD THEREFOR

CROSS REFERENCE TO RELATED APPLICATIONS

This application claims benefit to German Patent Application No. DE 102023103635.1, filed on Feb. 15, 2023, which is hereby incorporated by reference herein.

FIELD

The present invention relates to a computer system for displaying sample images, a microscope system including such a computer system, and to a method for displaying sample images.

BACKGROUND

In fields such as biology and medicine, microscopes can be used for imaging and/or viewing samples or specimens. One option for providing a plurality of samples for imaging is to use so-called "multiwell plates" (or "microtiter plates") with, for example, 96 depressions for receiving samples. However, with many sample images obtained in this or a similar manner, it can sometimes be difficult to maintain an overview when displaying the sample images.

SUMMARY

In an embodiment, the present disclosure provides a computer system for displaying sample images. The computer system includes one or more processors configured to receive at least one sample image, each of the at least one sample images having been obtained by imaging a sample located in or on a sample holder using a microscope according to an imaging process; receive or generate spatial context information regarding the at least one sample image, the spatial context information having reference to the imaging process for obtaining the at least one sample image; and control a display to display the at least one sample image on the display based on the spatial context information regarding the at least one sample image.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
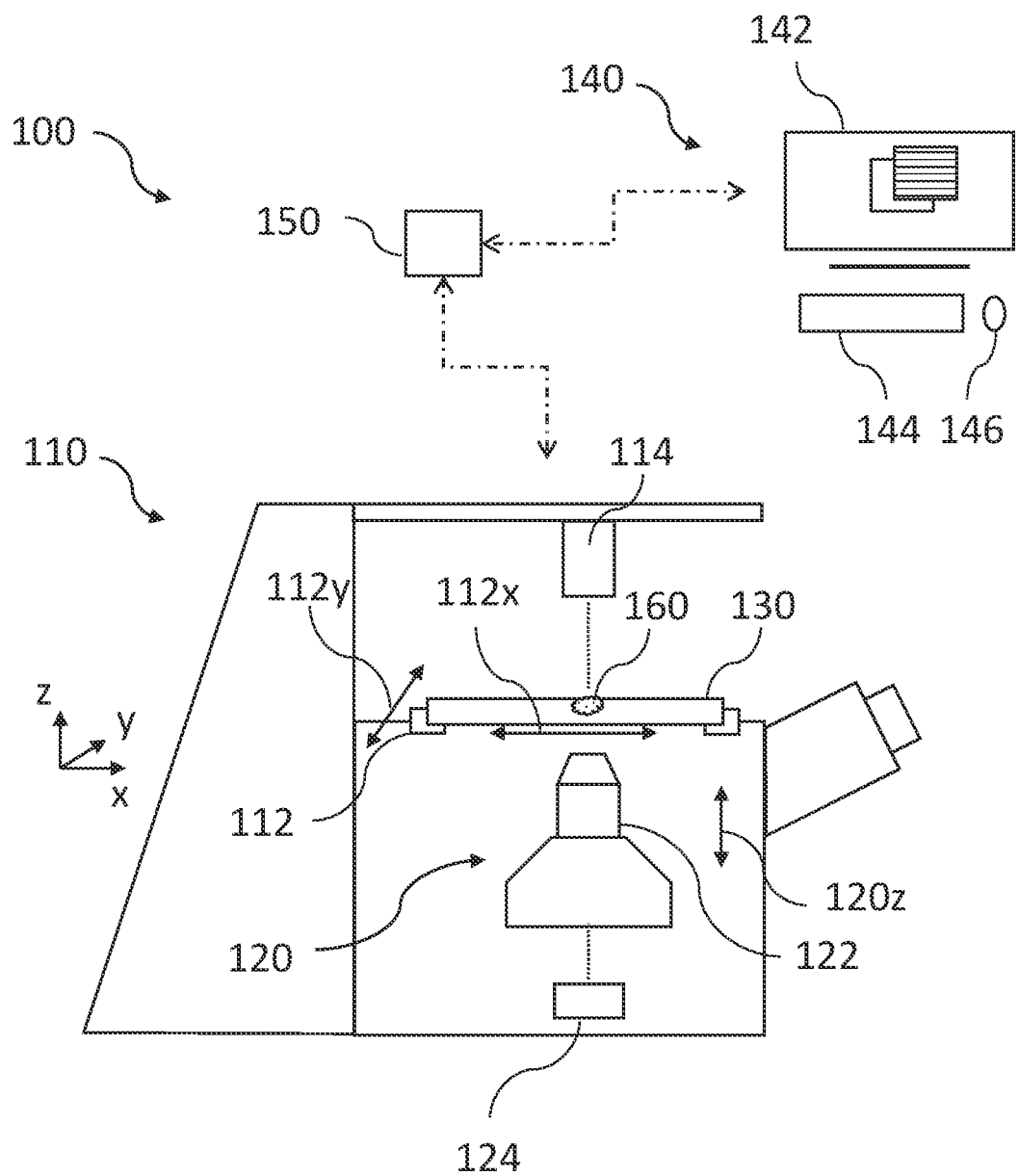
FIG. 1 schematically shows a microscope system according to an exemplary embodiment of the invention.

In view of the above described difficulties, there is a need for an improved way of displaying sample images. In accordance with exemplary embodiments of the invention, there are provided a computer system for displaying sample images, a microscope system including such a computer system, and a method for displaying sample images.

An exemplary embodiment of the invention relates to a computer system for displaying sample images. The computer system is configured to receive one or a plurality of sample images, the one or each of the plurality of sample images having been obtained by imaging a sample located in or on a sample holder, such as a multiwell plate, using a microscope. The computer system is further configured to receive or generate spatial context information regarding the one or the plurality of sample images, the spatial context information having reference to the imaging process (i.e., the process during which the sample image is obtained through imaging, for example, by a detector) for obtaining the one or at least one of the plurality of sample images. For example, the spatial context information may include information about a position of the samples relative to the sample holder or about a position of the sample image (if the sample image depicts only a portion of a sample) relative to the (entire) sample during image capture. In addition, the computer system is configured to control a display to display the one or at least one of the plurality of sample images on the display based on the spatial context information regarding the one or the plurality of sample images. Thus, in other words, the computer system is configured to generate and, in particular, output corresponding control signals for the display.

In this way, a user of the computer system can associate the sample images with the original spatial context and recognize them, even after the capture of the sample images and, in particular, independently thereof. This allows a better understanding of the displayed sample images, and thus of data and results. A larger context can be easily restored, for example to understand where the present sample image originates from. This makes it possible, for example, to easily and quickly assess whether a displayed sample image shows the healthy or the pathogenic ("diseased") portion of the tissue, the center or edge of the tissue, or the brain region from which the sample image originates.

In accordance with another exemplary embodiment of the invention, the computer system is configured to generate or receive a spatial context representation and to control the display to display the spatial context representation on the display. The spatial context representation may be included, for example, in the spatial context information. The spatial context representation includes at least one of the following spatial context representations: an image of the sample holder, a schematic representation of the sample holder, and an overview image covering a larger portion of the one or at least one of the plurality of samples than the one or the at least one of the plurality of sample images. For example, the overview sample image may cover a larger portion of the sample, the entire sample, or even parts outside the sample, e.g., a portion of the sample holder. This allows for easier and more accurate association of the sample image within the context during image capture.

In accordance with another exemplary embodiment of the invention, the computer system is further configured to control the display to display the one or the plurality of sample images on the display relative to the spatial context representation in such a way that the one or at least one of the plurality of sample images is displayed at a position of the spatial context representation that corresponds to a position of the respective sample in relation to a respective spatial context during the imaging process, such as, for example, the real sample holder or the sample. Thus, the spatial association of the sample image with the spatial context representation can be accomplished in particular based on the context information. The information required for this (as part of the context information) may have been determined, for example, during an overview scan. This allows even easier and more accurate association of the sample image within the context during image capture. Thus, a user can, for example, quickly see which portion of the sample is covered by the sample image or in which well of the sample holder the sample was located.

In accordance with a further exemplary embodiment of the invention, the spatial context information regarding the one or at least one of the plurality of sample images includes size or scaling information regarding the one or the plurality of sample images. In this context, the computer system is configured to control the display to display the one or the at least one of the plurality of sample images, based on the size or scaling information, and the spatial context representation simultaneously on the display. This makes it possible, for example, to display an overview image of the sample simultaneously with an enlarged view of the sample image.

In accordance with another exemplary embodiment of the invention, the computer system is configured to receive a zoom input entered by the user, for example, by operating a scroll wheel (of a computer mouse) or by clicking on a button displayed on the display. In addition, the computer system is configured to control the display to zoom the one or at least one of the plurality of sample images in response to and as a function of the zoom input from the user, which makes it possible, for example, to enlarge and/or reduce the displayed image section. This allows a user, for example, to view specific portions of the sample image in greater detail as needed or desired.

In accordance with a further exemplary embodiment of the invention, the computer system is further configured to control the display to zoom the spatial context representation simultaneously with, and in the same way as, the one or the at least one of the plurality of sample images in response to and as a function of the zoom input from the user. "Zooming in the same way" should be understood to mean, in particular, that the sample image and the spatial context representation are changed with the same zoom or scaling factor. This allows a user, for example, to view specific portions of the sample image in greater detail as needed or desired, while at the same time maintaining the spatial context.

In accordance with another exemplary embodiment of the invention, the computer system is configured to receive a plurality of sample images and to control the display to display the plurality of sample images simultaneously on the display based on the spatial context information regarding the plurality of sample images. This allows a user to get a simple and better overview with more information.

In accordance with a further exemplary embodiment of the invention, the plurality of sample images were obtained of samples located on at least two different sample holders. Therefore, the plurality of sample holders may have been used in particular at different times or even with different microscopes to obtain the sample images. Thus, the proposed method of display allows the user to be provided with information across different image capture operations.

In accordance with another exemplary embodiment of the invention, the spatial context representation includes only an image, or only a schematic representation of the sample holder, or only an overview image. This means that, for example, two or more sample images are displayed on a (common) sample holder, but e.g. in different wells. This allows the sample images to be more quickly and easily associated with the image capture operation.

In accordance with a further exemplary embodiment of the invention, the computer system is configured to receive one or one of a plurality of different display inputs from the user and to control the display to display the spatial context representation on the display in response to and as a function of the display input from the user. This allows a user, for example, to display the additional spatial context representation as required or desired.

In accordance with another exemplary embodiment of the invention, the computer system is configured to receive one or one of a plurality of different selection inputs from the user for selecting at least one of the obtained sample images and to control the display to display the at least one selected sample image on the display based on the context information in response to and as a function of the selection input received from the user. This allows a user, for example, to select and display a desired sample image, and to do so based on the spatial context information.

In accordance with a further exemplary embodiment of the invention, the spatial context information further includes position information regarding a position of one or a plurality of sample receptacles in the image or the schematic representation of the sample holder. "Sample receptacles" are understood herein to refer in particular to means for receiving the samples, such as, for example, wells or depressions in a multiwell plate. The computer system is then configured to receive a position input from the user, such as a mouse pointer position (of a computer mouse) on the display and to control the display to display the position information on the display in response to and as a function of the position input from the user. This allows a user, for example, to get to know the name of the position where the sample image was captured. Thus, the user can, for example, move the mouse pointer over a well in the image or the schematic representation of the sample holder, whereupon a number or other position indication of this well is displayed.

In accordance with another exemplary embodiment of the invention, the computer system is configured to control the display to display the one or the at least one of the plurality of sample images on the display and to simultaneously display the one or the at least one of the plurality of sample images on the display, based on the spatial context information regarding the one or the plurality of sample images, in an additional display area (e.g., in a so-called "non-modal window") of the display. This allows for a clearer presentation.

In accordance with a further exemplary embodiment of the invention, the spatial context information includes at least one of the following pieces of spatial context information: position information regarding a respective position of the one or the plurality of samples relative to the respective sample holder during the respective imaging process, position information regarding a respective position of the one or the plurality of sample images relative to the respective sample during the respective imaging process, and metadata (e.g., time of image capture or type of sample) regarding the one or at least one of the plurality of samples. Metadata can also have a spatial context, for example, when, based on the time of image capture, it is possible to determine the location or position at which the sample image was captured or the portion of a sample to which the sample image corresponds. This allows a user, for example, to quickly obtain more comprehensive information regarding the sample images.

In accordance with another exemplary embodiment of the invention, the computer system includes a controller for a microscope. In particular, the computer system may also be configured as the controller for the microscope. The microscope includes a sample stage and imaging optics, the sample stage being configured to receive a sample holder, and the imaging optics being configured to image one or a plurality of samples located on or in the sample holder when the sample holder is received on or in the sample stage. The computer system is then further configured to control the microscope to image the one or at least one of the plurality of samples in order to obtain the one or the plurality of sample images. This allows the sample images to be displayed using the same computer system with which they were captured, for example.

Another exemplary embodiment of the invention relates to a microscope system including a microscope, a display, and a computer system according to an exemplary embodiment of the invention. The microscope includes a sample stage and imaging optics, the sample stage being configured to receive a sample holder, and the imaging optics being configured to image one or a plurality of samples located on or in the sample holder when the sample holder is received on or in the sample stage.

A further exemplary embodiment of the invention relates to a method for displaying sample images and includes the following steps: one or a plurality of sample images are received, the one or each of the plurality of sample images having been obtained by imaging a sample located in or on a sample holder using a microscope. In addition, spatial context information regarding the one or the plurality of sample images is received or generated, the spatial context information having reference to the imaging process for obtaining the one or at least one of the plurality of sample images. Furthermore, a display is controlled to display the one or at least one of the plurality of sample images on the display based on the spatial context information regarding the one or the plurality of sample images.

With regard to the advantages and other exemplary embodiments of the microscope system, reference is made to the explanations given above with respect to the computer system, which apply here analogously.

Another exemplary embodiment of the invention relates to a computer program having a program code for performing the method according to an exemplary embodiment of the invention when the computer program is executed on a computer.

The term "and/or" includes any and all combinations of one or more of the associated listed items and may be abbreviated as "/".

Further advantages and embodiments of the invention will become apparent from the description and the accompanying drawings.

It is understood that the features mentioned hereinbefore and those to be commented on hereinafter may be used not only in the specified combinations, but also in other combinations or in isolation, without departing from the scope of the present invention.

Exemplary embodiments of the present invention are schematically illustrated in the drawings and will be described below with reference to the drawings.

In FIG. 1, there is schematically shown a microscope system 100 according to an exemplary embodiment of the invention. Microscope system 100 includes a microscope 110, a computer system 150, and, according to an exemplary embodiment, a human-machine interface 140. Computer system 150 includes, in particular, one or more processors and one or more memories. According to an exemplary embodiment, computer system 150 has a controller for microscope 110 or is designed as a controller for microscope 110. Human-machine interface 140 includes, by way of example, a display 142, a keyboard 144, and a computer mouse 146. It should be noted that other types of human-machine interfaces that include a display (e.g., a touch display) can also be used. Also, only the display 142 could be provided. Moreover, the human-machine interface, or a portion thereof, could be integrated into microscope 110, for example.

Microscope 110 includes a sample stage 112 and imaging optics 120. Sample stage 112 is configured to receive a sample holder 130. Imaging optics 120 include, by way of example, an objective 122 and an imaging sensor or detector 124. Imaging optics 120 are configured to image one or a plurality of samples (e.g., the sample 160 shown) located on or in sample holder 130 when sample holder 130 is received on or in sample stage 112. To this end, detector 124 may capture images of a sample on sample holder 130 via objective 122. In addition, microscope 110 may have an illumination source or illumination optics 114 configured to illuminate one or a plurality of samples on or in sample holder 130.

In an exemplary embodiment, microscope 110 is designed to allow lateral movement of objective 122 or also of imaging optics 120 in at least one lateral direction relative to sample holder 130 when sample holder 130 is received in sample stage 112. In the example shown in FIG. 1, sample stage 112 is designed to perform a lateral movement 112$x$ in the x-direction and a lateral movement 112$y$ in the y-direction; i.e., microscope 110 is designed to allow lateral movement of objective 122 in two lateral directions relative to sample stage 130. This allows samples to be imaged at different positions on sample holder 130, for example, in different wells of sample holder 130, by means of imaging optics 120.

In an exemplary embodiment, microscope 110 is designed to allow vertical movement of objective 122 in a vertical direction relative to sample holder 130 when sample holder 130 is received in sample stage 112. In the example shown in FIG. 1, objective 122, or, alternatively, imaging optics 120, is/are designed to perform a vertical movement 120$z$ in the z-direction. This makes it possible, for example, to focus to different points in a sample. In other words, a focus setting can be changed in this way.

It should be noted that the relative movements between the sample stage and the objective in lateral and vertical directions may be what matters, regardless of which component is fixed and which is movable. However, the example shown in FIG. 1 is a typical example of such an implementation.

It should also be noted that the two lateral directions x, y and the vertical direction z are represented and correspondingly used in a typical Cartesian coordinate system and in a typical definition of the lateral direction (in a plane in which the microscope stands, e.g., on a table) and of the vertical direction (in which focusing is performed in a direction perpendicular to the plane in which the microscope stands). However, other definitions of directions are also possible as long as the different directions differ from each other.

As mentioned, computer system 150 may be configured and used to control microscope 110. In addition, computer system 150 is configured to control display 142, in particular to display various information thereon, as will be explained in more detail later herein. In an exemplary embodiment, computer system 150 is also configured to control human-machine interface 140, i.e., not only to control display 142, but also to receive, for example, control signals from the human-machine interface (e.g., from keyboard 144 and computer mouse 146), the control signals, in turn, enabling computer system 150 to control microscope 110.

Furthermore, computer system 150 is configured to control microscope 110 to image the one or at least one of the plurality of samples in order to obtain the one or the plurality of sample images. In particular, computer system 150 may also be configured to perform the aforementioned lateral and/or vertical relative movements between sample stage 112 and imaging optics 120 or objective 122, respectively. This makes it possible to generate images of samples at different positions of the sample holder, such as samples in different wells of a multiwell plate. While these images may be, for example, high-resolution images, it is also possible, for example, to generate a so-called overview scan covering all or a portion of the samples and, possibly, of the sample holder, and if so, with low resolution, for example. The spatial context information, to be described in more detail later, may be contained therein or may, for example, be obtained in this way. Similarly, for example, the spatial context representations (e.g., an image of the sample holder) may be generated in this way.

Computer system 150 may further be configured to receive or generate spatial context information regarding the one or the plurality of sample images, the spatial context information having reference to the imaging process for obtaining the one or at least one of the plurality of sample images. Moreover, the computer system may be configured to control display 142 to display the one or at least one of the plurality of sample images on display 142 based on the spatial context information regarding the one or the plurality of sample images. In an exemplary embodiment, computer system 150 is further configured to control display 142 to display a spatial context representation on display 142. The spatial context information and the spatial context representation will be described in more detail below by way of example with reference to the following figures.

Figure 2:
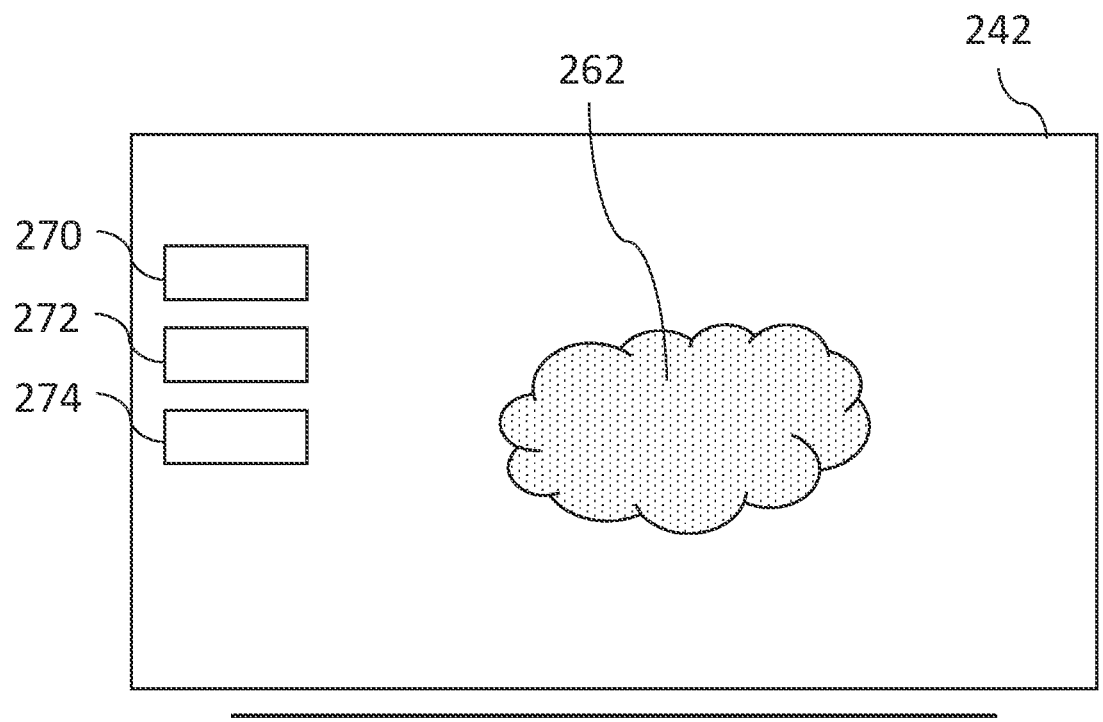
FIG. 2 schematically shows a display to illustrate the background of the invention.

In FIG. 2, there is schematically shown a display 242 to illustrate the background of the invention. Display 242 may correspond, for example, to the display 142 of FIG. 1. Various information can be displayed on display 242, for example by controlling it via a computer system such as the computer system 150 of FIG. 1. In other words, the computer system is configured to generate a user interface on the display, the user interface including the various information.

In the exemplary embodiment according to FIG. 2, three buttons or control fields 270, 272, 274 are shown by way of example on display 242. These control fields may be, for example, so-called "soft buttons." A user may, for example, use a computer mouse, such as computer mouse 146 of FIG. 1, to move a mouse pointer over one of the control fields 270, 272, 274 and then perform a mouse click. This represents, for example, a user input that the computer system may then receive. However, instead of the control fields 270, 272, 274 and the computer mouse, certain keys on a keyboard, such as keyboard 144 of FIG. 1, for example, may be defined accordingly. If display 242 is configured, for example, as a touch display, a user input can be made, for example, by touching one of the control fields 270, 272, 274.

In addition to control fields 270, 272, 274, a sample image 262 is also displayed on display 242. Sample image 262 may be, for example, a sample image that was obtained of a sample located in or on a sample holder during an imaging process using a microscope, as explained, for example, with reference to FIG. 1 and microscope 110. The sample image 262 shown here on display 242 allows a user to obtain information about the sample itself, provided this information is contained in the sample image; i.e. the graphical representation. However, no further context information about the sample image with reference to the imaging process for obtaining sample image 262 is visible here or has been used for the display of sample image 262.

Figure 3:
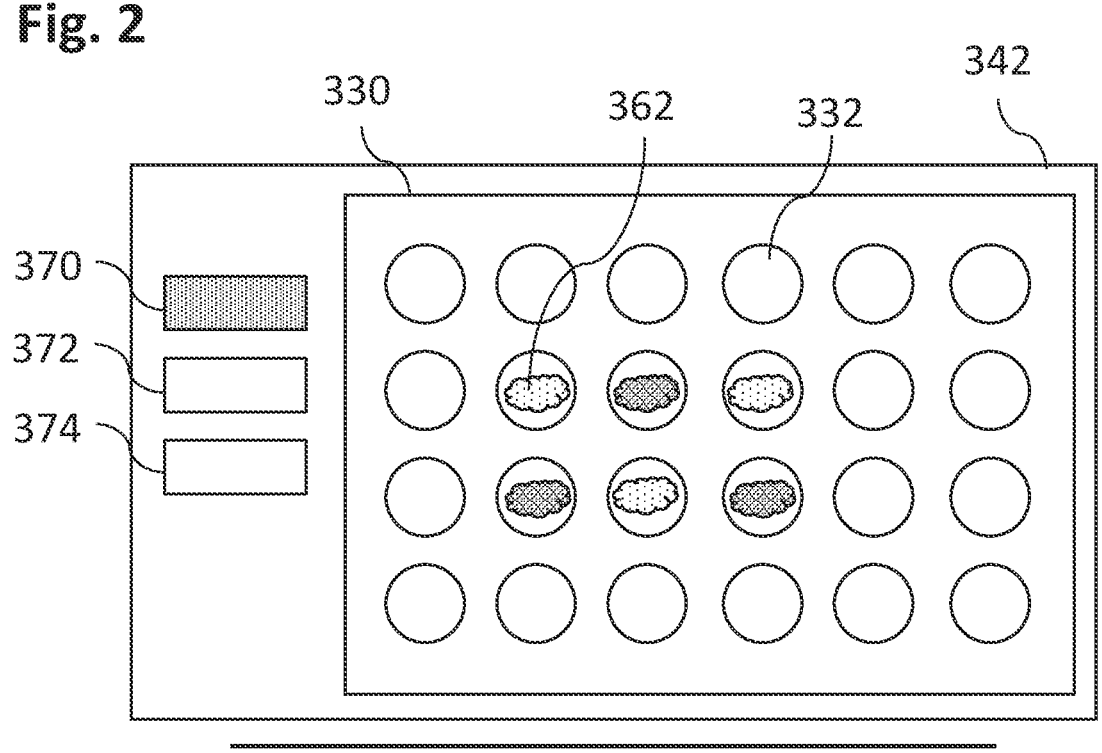
FIG. 3 schematically shows a display to illustrate an exemplary embodiment of the invention.

In FIG. 3, there is schematically shown a display 342 to illustrate an exemplary embodiment of the invention. In the exemplary embodiment according to FIG. 3, three buttons or control fields 370, 372, 374 are shown by way of example on display 342. Display 342 may correspond to the display 242 of FIG. 2. Similarly, control fields 370, 372, 374 may correspond to the control fields 270, 272, 274 of FIG. 2. In this respect, as well as with regard to corresponding user inputs, reference can be made to the description of FIG. 2, which applies here accordingly.

Unlike in FIG. 2, in an exemplary embodiment, a spatial context representation including a schematic representation 330 of a sample holder (e.g., sample holder 130 of FIG. 1) is displayed or shown on display 342. As can be seen from schematic representation 330, the sample holder is a so-called "multiwell plate" having a plurality of wells as sample receptacles. A representation of such a well is denoted by 332. By way of example, the underlying sample holder has a total of 24 wells. Such a schematic representation 330 may, for example, have been previously stored on the computer system by a user, or may, for example, have been generated automatically based on the above-mentioned overview scan.

Moreover, in an exemplary embodiment, several, for example, six sample images are displayed. A sample image is displayed in each of, for example, six wells (or the schematic representations thereof). By way of example, one of these six sample images is denoted by 362. Sample image 362 may, for example, be the sample image 262 of FIG. 2, but shown in reduced size. In other words, a plurality of sample images and a schematic representation 330 of a sample holder are displayed simultaneously on display 342. Furthermore, these multiple sample images are displayed on display 342 relative to the schematic representation 330 of the sample holder (i.e., the spatial context representation) in such a way that the sample images are displayed at a position of the schematic representation 330 of the sample holder that corresponds to a position of the respective sample in relation to a respective spatial context during the imaging process. The exemplary six sample images (one of which is denoted by 362) are thus shown in those wells of the sample holder in which the samples underlying the sample images were located in the real sample holder. In this case, there were actually six different samples. In an embodiment, these different sample images may also have been obtained from different samples in different sample holders (and not just different wells of one sample holder).

The here shown display of the sample images relative to the schematic representation 330 of the sample holder is an example illustrating that the sample images are displayed based on spatial context information, the spatial context information having reference to the imaging process for obtaining the sample images, in this case, by way of example, position information regarding a respective position of the samples relative to the respective sample holder during the respective imaging process. This spatial context information may have been acquired, for example, during an overview scan in which the entire sample holder and its wells (or, for example, only a portion thereof) were scanned or imaged. Such an overview scan may have been performed, for example, prior to detailed imaging of the individual samples. The respective spatial context information may then have been filed or stored in a suitable manner.

By way of example, FIG. 3 further shows that command button 370 is displayed shaded. This may mean, for example, that command button 370 has been pressed, i.e., a display input has been received from the user. A user may have clicked on command button 370 using, for example, the computer mouse. In an exemplary embodiment, in response to and as a function of a display input so received from the user, the computer system may control the display to display the one or at least one of the plurality of sample images, based on the spatial context information and/or the spatial context representation, on the display.

Such a display input from the user (i.e., a click on command button 370) may, for example, cause the representation displayed on the display to change from that shown in FIG. 2 to that shown in FIG. 3. Thus, in other words, a user looking, for example, at the representation shown in FIG. 2 may click on the corresponding command button, and the schematic representation of the sample holder with the sample image and, where applicable, additional sample images will be displayed to the user. This allows the user to immediately see from where or from which sample the sample image originates.

It is also conceivable, for example, that the command button 370 that allows for the representation as shown in FIG. 3 may only be displayed or only be selectable if the corresponding spatial context information and/or the schematic representation 330 of the sample holder (or another spatial context representation) are available.

In an exemplary embodiment, it may also be provided that the representation shown in FIG. 3 is obtained independently of the representation shown in FIG. 2. Thus, a user may, for example, select the exemplary six sample images using, for example, a selection structure that can be displayed or is displayed on the display.

In the example shown here, the spatial context representation is displayed together the plurality of sample images directly in the user interface in the single window, that is, e.g., instead of the representation with the sample image as shown in FIG. 2. In an exemplary embodiment, the spatial context representation may also be displayed together the plurality of sample images in an additional display area of the display, in a so-called "modal window." This may then occur in addition to—and in particular also in overlap with—the display of the sample image as shown in FIG. 2. It may then be possible, for example, to move this additional display area (window), and thus, for example, to view portions of the larger representation of the sample image (as in FIG. 2).

Figure 4:
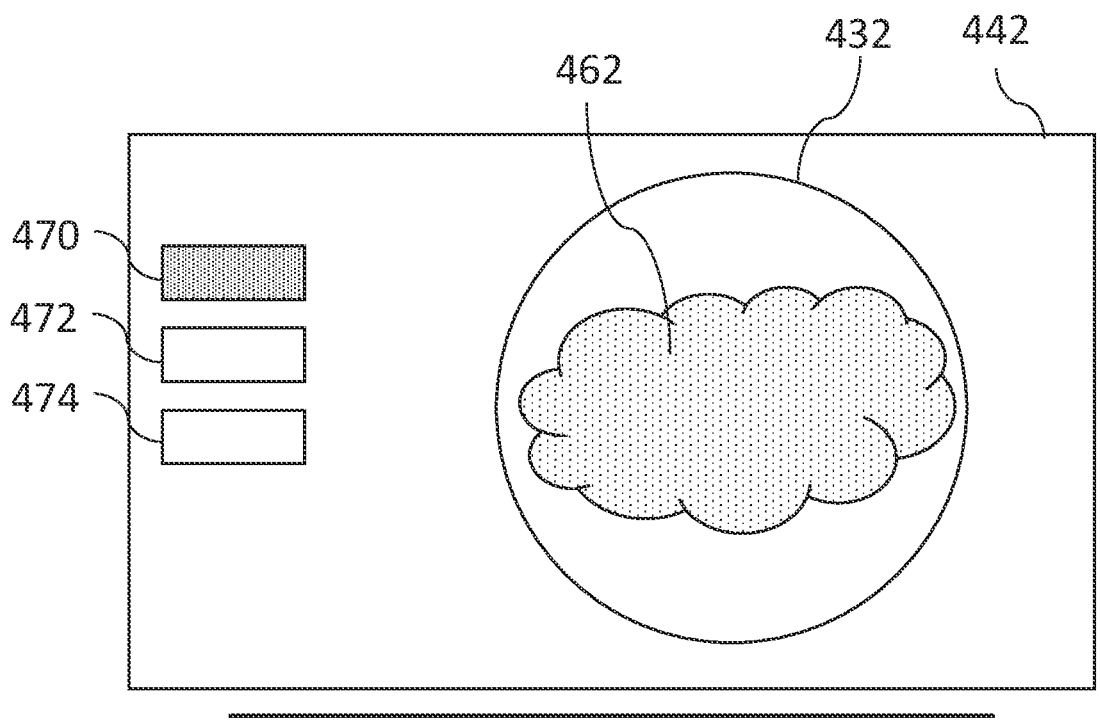
FIG. 4 schematically shows a display to illustrate a further exemplary embodiment of the invention.

In FIG. 4, there is schematically shown a display 442 to illustrate a further exemplary embodiment of the invention. In the exemplary embodiment according to FIG. 4, three buttons or control fields 470, 472, 474 are shown by way of example on display 442. Display 442 may correspond to the display 342 of FIG. 3. Similarly, control fields 470, 472, 474 may correspond to the control fields 370, 372, 374 of FIG. 3. In this respect, as well as with regard to corresponding user inputs, reference can be made to the description of FIGS. 2 and 3, which applies here accordingly.

Unlike in FIG. 3, in an exemplary embodiment, a sample image 462 in a well 432 of a schematic representation of a sample holder is shown significantly larger on display 442, and also, only this single sample image with the single well is displayed. Sample image 462 and well 432 may be, for example, an enlarged representation of sample image 362 in the associated well according to FIG. 3.

In an exemplary embodiment, to arrive at the view shown in FIG. 4, a user may enter a zoom input that the computer system receives. To this end, the user may, for example, operate or rotate the scroll wheel after moving the mouse pointer over the desired sample image to be zoomed or the desired location in the sample image. This can be done, for example, in the representation shown in FIG. 3. In response to and as a function of the zoom input from the user, the computer system then controls the display to zoom the sample image, that is, for example, to enlarge it. In this case, in an exemplary embodiment, in response to and depending on the zoom input from the user, the display may be controlled to zoom the spatial context representation simultaneously with, and in the same way as, the sample image, as exemplarily shown in FIG. 4.

If the spatial context representation is not shown, for example, because it has been hidden (e.g., by re-pressing a corresponding command button, such as, for example, the command button 370 according to FIG. 3 or 470 according to FIG. 4), it is also possible to zoom only the sample image. It is understood that "zooming" may not only encompass an increase in size but also a reduction in size.

It is also conceivable, for example, to indicate to a user (e.g., by information on the display) whether and/or for which sample image the zooming option is available. For example, it may be provided that zooming is enabled only when a sample image is displayed. Similarly, it may be provided that when a plurality of sample images are displayed, one of these can or must be selected (e.g., by selecting or clicking in a menu structure) in order to enable zooming for the selected sample image.

Figure 5:
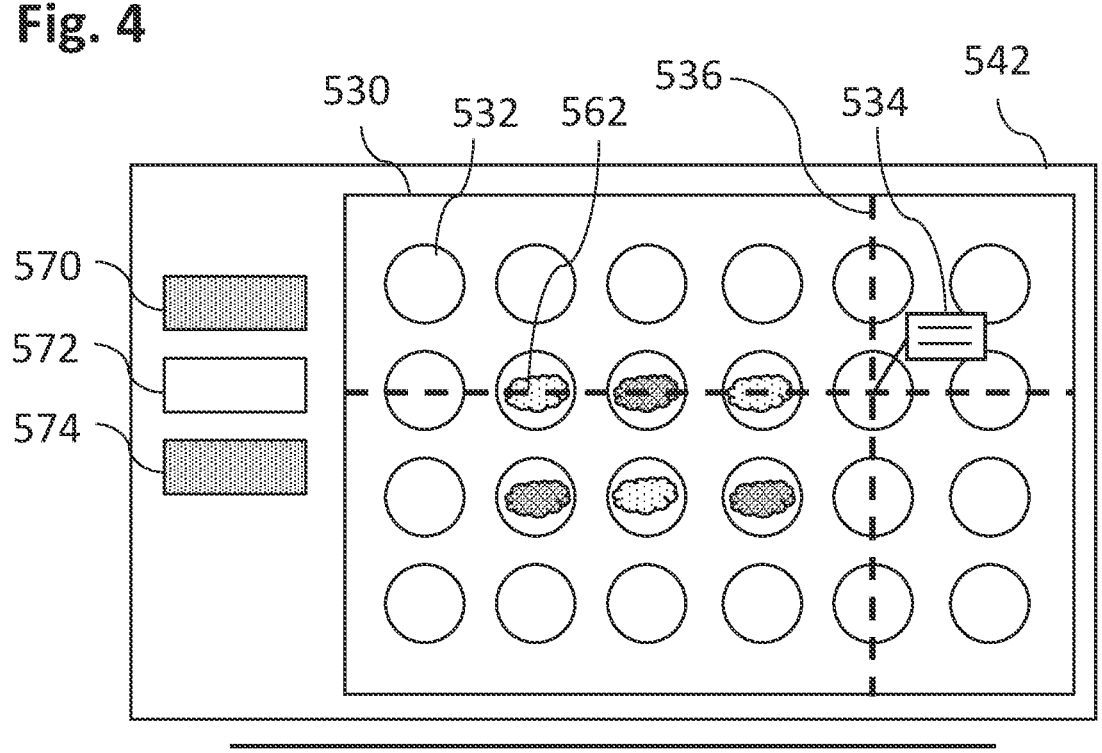
FIG. 5 schematically shows a display to illustrate another exemplary embodiment of the invention.

In FIG. 5, there is schematically shown a display 542 to illustrate a further exemplary embodiment of the invention. In the exemplary embodiment according to FIG. 5, three buttons or control fields 570, 572, 574 are shown by way of example on display 542. Display 542 may correspond to the display 342 of FIG. 3. Similarly, control fields 570, 572, 574 may correspond to the control fields 370, 372, 374 of FIG. 3. In this respect, as well as with regard to corresponding user inputs, reference can be made to the description of FIGS. 2 and 3, which applies here accordingly.

Here, as in FIG. 3, a schematic representation 530 of the sample holder and its wells (one of which is denoted by 532) is displayed as a spatial context representation together with exemplary six sample images, one of which is denoted by 562. In this respect, the representation on display 542 may correspond to the representation on the display 342 according to FIG. 3.

Furthermore, according to an exemplary embodiment, position information 534 is displayed on display 542. To this end, a user may enter a position input that the computer system receives. Such a position input 536 from the user is shown by way of example, specifically in the form of cross hairs. Instead of the cross hairs, other options are also conceivable, such as only a mouse pointer or any other shape. For example, it may be provided that the user can activate the display of the cross hairs, for example, by clicking on command button 574. By operating, for example, the computer mouse, the user can then select a position within the schematic representation 530 of the sample holder in a targeted manner, i.e., enter a position input, in order to obtain position information 534 in response thereto and as a function thereof. Position information 534 may include information about the number of the respective well within the sample holder, including, for example, an indication of a row and/or a column. In the example shown, position information 534 would then include, for example, the information "row 2, column 5." However, instead of and/or in addition to the position information, other information may also be displayed, for example, meta information regarding the sample that is or was located in the well (at least if a sample is or was in the selected well). The position information and/or the meta information in particular also represent spatial context information.

Figure 6:
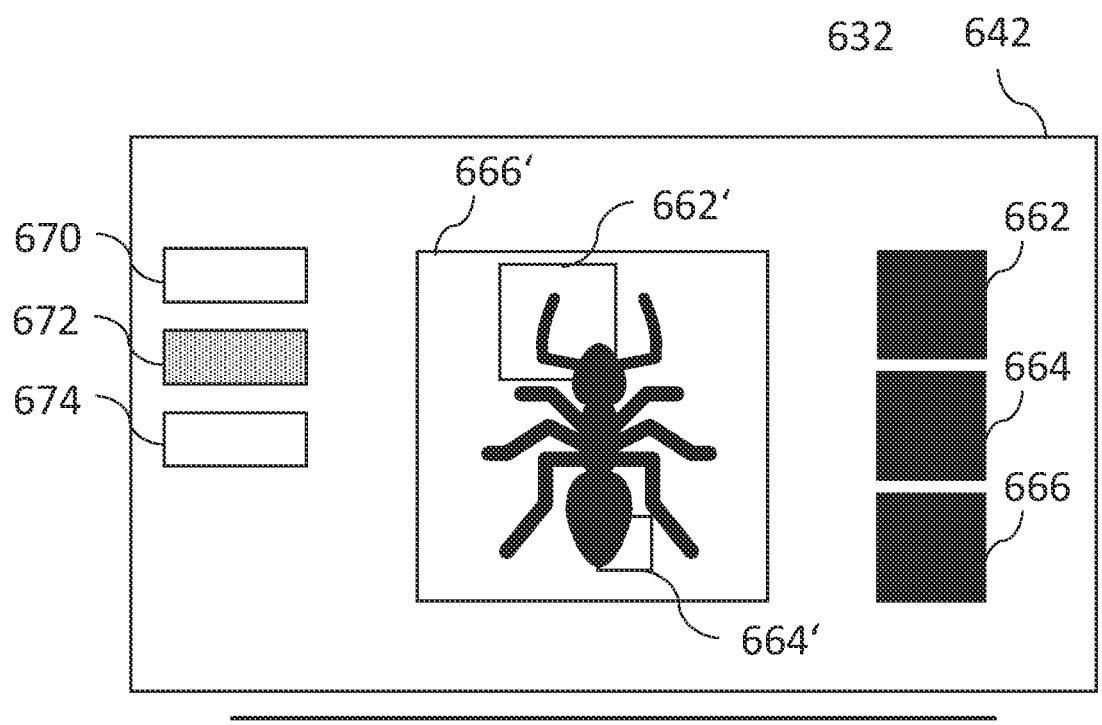
FIG. 6 schematically shows a display to illustrate yet another exemplary embodiment of the invention.

In FIG. 6, there is schematically shown a display 642 to illustrate an exemplary embodiment of the invention. In the exemplary embodiment according to FIG. 6, three buttons or control fields 670, 672, 674 are shown by way of example on display 642. Display 642 may correspond to the display 242 of FIG. 2. Similarly, control fields 670, 672, 674 may correspond to the control fields 270, 272, 274 of FIG. 2. In this respect, as well as with regard to corresponding user inputs, reference can be made to the description of FIG. 2, which applies here accordingly.

Unlike in FIG. 2, in an exemplary embodiment, two sample images 662, 664 are displayed or shown by way of example on the right side on display 642. These two sample images 662, 664 show, for example, different portions of a sample. Also displayed or shown on the right side is a spatial context representation including an overview image 666. Overview image 666 covers a larger portion of the sample than sample images 662, 664. For example, the overview sample image may cover a larger portion of the sample, the entire sample, or even parts outside the sample, e.g., a portion of the sample holder. In the example shown, overview image 666 covers the (entire) sample, here an ant.

As can be seen from sample images 662, 664 and overview image 666, sample images 662, 664 provide a detailed view of the samples at the relevant location; however, no spatial context relating to overview image 666 is available or visible here.

Furthermore, in an embodiment, two sample images 662', 664' are displayed or shown in the middle of display 642 in addition to an overview image 666' (a spatial context representation). In terms of image content, sample images 662', 664' correspond to sample images 662, 664, and overview image 666' corresponds to overview image 666. However, sample images 662', 664' are shown based on a spatial context that includes position information regarding a particular position of the sample images relative to the respective sample during the respective imaging process. A user can, for example, immediately see at which location or position of the sample (here the ant) the respective sample image 662' or 664' was generated.

In an embodiment and as shown in FIG. 6, the spatial context information for sample images additionally includes size or scaling information regarding the plurality of sample images. The borders around sample images 662', 664' are of different sizes, thereby indicating to the user that the corresponding sample images 662, 664 are scaled or also the extent to which they are scaled.

Thus, in an embodiment, sample images 662, 664 as well as overview image 666', including sample images 662', 564', which here provide the size or scaling information, can be displayed on display 642. Overview image 666 can but does not have to be displayed.

By way of example, FIG. 6 further shows that command button 672 is shown shaded. This may mean, for example, that command button 672 has been pressed, i.e., a display input has been received from the user. A user may have clicked on command button 672 using, for example, the computer mouse. In an exemplary embodiment, in response to and as a function of a display input so received from the user, the computer system may control the display to display the one or at least one of the plurality of sample images based on the spatial context information, which includes the size or scaling information, and the spatial context representation (e.g., the overview image) on the display.

It is also conceivable, for example, that command button 672, which allows for the representation as shown in FIG. 6, may only be displayed or only be selectable if the corresponding spatial context information and/or the overview image (or another spatial context representation) are available.

Figure 7:
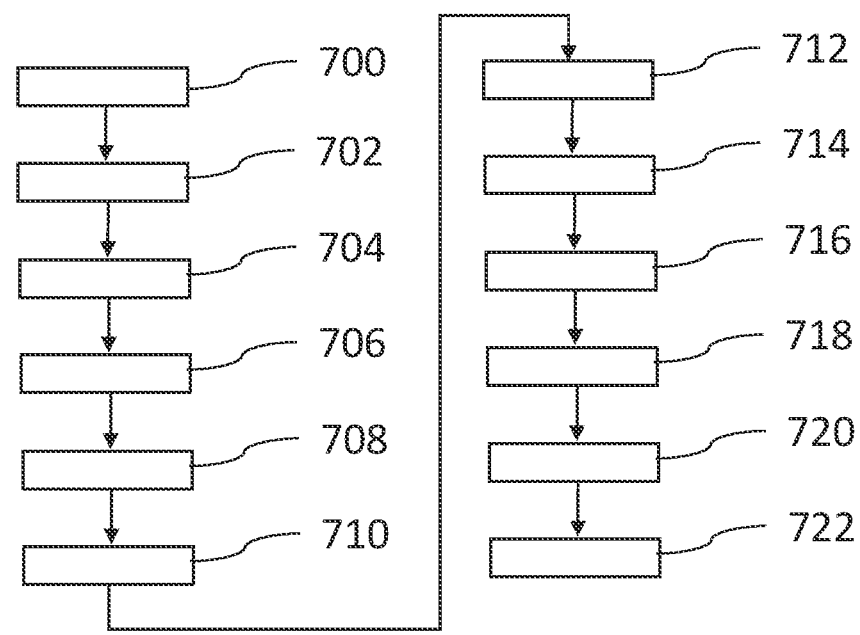
FIG. 7 schematically shows a flow chart of a method according to an exemplary embodiment of the invention.

In FIG. 7, there is schematically shown a flow chart of a method according to an exemplary embodiment of the invention. For this purpose, a computer system or a microscope system as described above with reference to various exemplary embodiments can be used. The method may in particular include the following steps:

Initially, in an optional step 700, for example, an overview scan 702 of a sample holder with different samples may be created. This overview scan 702 may be received in the computer system. In addition, in a step 704, one or a plurality of sample images 706 may be obtained of one or a plurality of the samples. To this end, the samples may, for example, be imaged in detail. Then, in a step 708, spatial context information 710 may be received or generated. Context information 710 has reference to the imaging process for obtaining the respective sample image. For example, when capturing a sample image, the relative position of the objective with respect to the sample holder may be recorded. This may also be done using the overview scan.

In an optional step 712, a spatial context representation 714 is received or generated. This spatial context representation may be generated, for example, from the overview scan or from one or a plurality of sample images.

Then, in a step 716, a display is controlled to display the one or at least one of the plurality of sample images on the display based on the spatial context information regarding the one or the plurality of sample images. Optionally, for example, the spatial context representation may also be displayed on the display.

In an exemplary embodiment, one or one of a plurality of different display inputs 718 may be received from the user, in response to which and as a function thereof the display is controlled to display the spatial context representation on the display.

In an exemplary embodiment, one or one of a plurality of different selection inputs 720 may be received from the user for selecting at least one of the obtained sample images, in response to which and as a function thereof the display is controlled to display the at least one selected sample image on the display based on the spatial context information.

In an exemplary embodiment, a zoom input 722 may be received from the user, in response to which and as a function thereof the display is controlled to zoom the one or at least one of the plurality of sample images.

Although some aspects have been described in the context of a device, it is clear that these aspects also represent a description of the corresponding method, where a block or device corresponds to a method step or a feature of a method step. Analogously, aspects described in the context of a method step also represent a description of a corresponding block or item or feature of a corresponding device.

Some exemplary embodiments relate to a microscope that includes a system as described in connection with one or more of FIGS. 1 through 7. Alternatively, a microscope may be part of, or connected to, a system such as described in connection with one or more of FIGS. 1 through 7. FIG. 1 shows in schematic form a microscope system or system 100 configured to perform a method as described herein. Microscope system 100 includes a microscope 110 and a computer system 150. Microscope 110 is configured to capture images and is connected to computer system 150. Computer system 150 is configured to perform at least a portion of a method described hereby. Computer system 150 may be configured to execute a machine-learning algorithm. Computer system 150 and microscope 110 may be separate units, but may also be integrated into a common housing. Computer system 150 could be part of a central processing system of microscope 110 and/or computer system 150 could be part of a subcomponent of microscope 110, such as a sensor, an actuator, a camera, or an illumination unit, etc., of microscope 110.

Computer system 150 may be a local computer device (e.g., personal computer, laptop, tablet computer, or mobile phone) having one or more processors and one or more memory devices or may be a distributed computer system (i.e., a cloud computing system having one or more processors and one or more memory devices distributed at different locations, such as, for example, at a local client and/or one or more remote server farms and/or data centers). Computer system 150 may include any circuit or combination of circuits. In an exemplary embodiment, computer system 150 may include one or more processors of any type. As used herein, "processor" may mean any type of computing circuit, such as, for example, but not limited to, a microprocessor, a microcontroller, a complex instruction set microprocessor (CISC), a reduced instruction set microprocessor (RISC), a very long instruction word (VLIW) microprocessor, a graphics processor, a digital signal processor (DSP), a multi-core processor, a field-programmable gate array (FPGA) of, for example, a microscope or a microscope component (e.g., camera), or any other type of processor or processing circuit. Other types of circuits that may be included in computer system 150 include a custom-built circuit, an application-specific integrated circuit (ASIC), or the like, such as, for example, one or more circuits (e.g., a communication circuit) for use in wireless devices such as mobile phones, tablet computers, laptop computers, radio phones, and similar electronic systems. Computer system 150 may include one or more memory devices, which may include one or more memory elements suitable for the particular application, such as, for example, a main memory in the form of a random access memory (RAM), one or more hard disks, and/or one or more drives that handle removable media such as CDs, flash memory cards, DVDs, and the like. Computer system 150 may also include a display device, one or more loudspeakers, and a keyboard, and/or a controller, which may include a mouse, a trackball, a touch screen, a voice recognition device, or any other device allowing a system user to input information to computer system 150 and receive information therefrom.

Some or all of the method steps may be executed by (or using) a hardware apparatus, such as, for example, a processor, a microprocessor, a programmable computer, or an electronic circuit. In some exemplary embodiments, one or more of the most important method steps may be executed by such an apparatus.

Depending on certain implementation requirements, exemplary embodiments of the invention can be implemented in hardware or in software. The implementation can be performed using a non-volatile storage medium such as a digital storage medium, for example a floppy disk, a DVD, a Blu-Ray, a CD, a ROM, a PROM, an EPROM, an EEPROM, or a FLASH memory, having electronically readable control signals stored thereon, which cooperate (or are capable of cooperating) with a programmable computer system such that the respective method is performed. Therefore, the digital storage medium may be computer-readable.

Some exemplary embodiments according to the invention include a data carrier having electronically readable control signals which are capable of cooperating with a programmable computer system such that one of the methods described herein is performed.

Generally, exemplary embodiments of the present invention can be implemented as a computer program product with a program code, the program code being operative for performing one of the methods when the computer program product runs on a computer. The program code may, for example, be stored on a machine-readable carrier.

Other exemplary embodiments include the computer program for performing one of the methods described herein, stored on a machine-readable carrier.

In other words, one exemplary embodiment of the present invention is therefore a computer program having a program code for performing one of the methods described herein when the computer program runs on a computer.

A further exemplary embodiment of the present invention is therefore a storage medium (or a data carrier or a computer-readable medium) including a computer program stored thereon for performing one of the methods described herein when executed by a processor. The data carrier, the digital storage medium, or the recorded medium are typically tangible and/or non-transitory. Another exemplary embodiment of the present invention is a device as described herein that includes a processor and the storage medium.

A further exemplary embodiment of the invention is therefore a data stream or a sequence of signals representing the computer program for performing one of the methods described herein. The data stream or the sequence of signals may, for example, be configured to be transferred via a data communication connection, for example via the Internet.

A further exemplary embodiment includes a processing means, for example, a computer or a programmable logic device, configured or adapted to perform one of the methods described herein.

A further exemplary embodiment includes a computer having installed thereon the computer program for performing one of the methods described herein.

A further exemplary embodiment according to the invention includes an apparatus or a system configured to transfer (for example, electronically or optically) a computer program for performing one of the methods described herein to a receiver. The receiver may be, for example, a computer, a mobile device, a memory device, or the like. The apparatus or system may, for example, include a file server for transferring the computer program to the receiver.

In some exemplary embodiments, a programmable logic device (e.g., a field-programmable gate array (FPGA)) may be used to perform some or all of the functionalities of the methods described herein. In some exemplary embodiments, a field-programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 microscope system
110 microscope
112 sample stage
112x, 112y lateral movement
114 illumination optics
120 imaging optics
120z vertical movement
122 objective
124 detector
130 sample holder
140 human-machine interface
142, 242, 342, 442, 542, 642 display
144 keyboard
146 computer mouse
150 computer system
262, 362, 462, 562, 662, 662', 664, 664' sample image
270, 272, 274, 370, 372, 374, 470, 472, 474, 570, 572, 574, 670, 672, 674 control fields
330, 530 schematic representation of a sample holder
332, 432, 532 well
534 position information
536 position input from the user
666, 66' overview image
700, 704, 708, 712, 716 method steps
702 overview scan
706 sample images
710 spatial context information
714 spatial context representation
718 display inputs from the user
720 selection inputs from the user
722 zoom input from the user

The invention claimed is:

1. A computer system for displaying sample images, the computer system comprising one or more processors configured to:
receive at least one sample image, each of the at least one sample images-image having been obtained by imaging a sample located in or on a sample holder using a microscope according to an imaging process;
receive or generate spatial context information regarding the at least one sample image, the spatial context information having reference to the imaging process for obtaining the at least one sample image;
receive or generate a spatial context representation, the spatial context representation including an image of the sample holder or a schematic representation of the sample holder; and
control a display to display the at least one sample image and the spatial context representation on the display based on the spatial context information regarding the at least one sample image.

2. The computer system as recited in claim 1, wherein the spatial context representation further includes an overview image covering a larger portion of the sample than the at least one sample image.

3. The computer system as recited in claim 2, wherein the spatial context representation includes only the image of the sample holder, or only the schematic representation of the sample holder.

4. The computer system as recited in claim 1, further configured to control the display to display the at least one sample image on the display relative to the spatial context representation in such a way that the at least one sample image is displayed at a position of the spatial context representation that corresponds to a position of the respective sample in relation to a respective spatial context during the imaging process.

5. The computer system as recited in claim 1, wherein the spatial context information regarding the plurality of sample images includes size or scaling information regarding the at least one sample image, and wherein the computer system is further configured to control the display to display the at least one sample image, based on the size or scaling information, and the spatial context representation simultaneously on the display.

6. The computer system as recited in claim 1, further configured to:
receive a zoom input from a user; and
control the display to zoom the at least one sample image in response to and as a function of the zoom input from the user.

7. The computer system as recited in claim 1, further configured to:
receive at least two sample images; and
control the display to display the at least two sample images simultaneously on the display based on the spatial context information regarding the at least two sample images.

8. The computer system as recited in claim 7, wherein the at least two sample images were obtained from samples located on at least two different sample holders.

9. The computer system as recited in claim 1, further configured to:
receive a display input from a user, the display input being one or one of a plurality of different display inputs; and
control the display to display the spatial context representation on the display in response to and as a function of the display input from the user.

10. The computer system as recited in claim 1, further configured to:
  receive a selection input from a user for selecting at least one of the obtained sample images, the selection input being one or one of a plurality of different selection inputs; and
  control the display to display the at least one selected sample image on the display, based on the spatial context information, in response to and as a function of the selection input received from the user.

11. The computer system as recited in claim 1, wherein the spatial context information further comprises position information regarding a position of at least one sample receptacle in the image of the sample holder or the schematic representation of the sample holder,
  wherein the computer system is further configured to:
    receive a position input from a user; and
    control the display to display the position information on the display in response to and as a function of the position input from the user.

12. The computer system as recited in claim 1, further configured to control the display to display the at least one sample image on the display and to simultaneously display the at least one sample image on the display, based on the spatial context information regarding the at least one sample image, in an additional display area of the display.

13. The computer system as recited in claim 1, wherein the spatial context information comprises at least one of the following pieces of the spatial context information:
  position information regarding a respective position of the at least one sample relative to the sample holder during the respective imaging process;
  position information regarding a respective position of the at least one sample image relative to the respective sample during the respective imaging process; or
  metadata regarding the at least one sample.

14. A microscope system comprising a microscope, a display, and a computer system according to claim 1, the microscope including a sample stage and imaging optics, the sample stage being configured to receive the sample holder, and the imaging optics being configured to image at least one sample located on or in the sample holder when the sample holder is received on or in the sample stage.

15. A computer system for displaying sample images, the computer system comprising one or more processors configured to:
  receive at least one sample image, each of the at least one sample image having been obtained by imaging a sample located in or on a sample holder using a microscope according to an imaging process;
  receive or generate spatial context information regarding the at least one sample image, the spatial context information having reference to the imaging process for obtaining the at least one sample image;
  receive or generate a spatial context representation:
  control a display to display the at least one sample image and the spatial context representation on the display based on the spatial context information regarding the at least one sample image; and
  control the display to zoom the spatial context representation simultaneously with, and in the same way as, the at least one sample image in response to and as a function of a zoom input from a user.

16. A method for displaying sample images, the method comprising:
  receiving at least one sample image, each of the at least one sample image having been obtained by imaging a sample located in or on a sample holder using a microscope according to an imaging process;
  receiving or generating spatial context information regarding the at least one sample image, the spatial context information having reference to the imaging process for obtaining the at least one sample image;
  receiving or generating a spatial context representation, the spatial context representation including an image of the sample holder or a schematic representation of the sample holder; and
  controlling a display to display the at least one sample image and the spatial context representation on the display based on the spatial context information regarding the at least one sample image.

17. A non-transitory computer-readable medium having processor-executable instructions stored thereon, wherein the processor-executable instructions, when executed by one or more processors, facilitate the performance of the method according to claim 16.

* * * * *